United States Patent
Wallther

(10) Patent No.: US 6,688,430 B1
(45) Date of Patent: Feb. 10, 2004

(54) DEVICE FOR COUPLING SCAFFOLDING ELEMENTS

(75) Inventor: Harry Wallther, Hindås (SE)

(73) Assignee: Pluseight Technology AB (SE)

( * ) Notice: Subject to any disclaimer, the term of this patent is extended or adjusted under 35 U.S.C. 154(b) by 0 days.

(21) Appl. No.: 10/111,959

(22) PCT Filed: Oct. 31, 2000

(86) PCT No.: PCT/SE00/02139

§ 371 (c)(1),
(2), (4) Date: Aug. 26, 2002

(87) PCT Pub. No.: WO01/33013

PCT Pub. Date: May 10, 2001

(30) Foreign Application Priority Data

Nov. 1, 1999 (SE) .............................. 9903934

(51) Int. Cl.⁷ .............................. E04G 1/00; E04G 7/00
(52) U.S. Cl. ................................ 182/186.8; 182/186.7; 403/49; 403/187
(58) Field of Search ................ 182/186.8, 186.7, 182/179.1, 178.1, 222; 403/49, 246, 187, 188, 353, 408.1; 52/637, 655.1, 656.9, 638, 651.1

(56) References Cited

U.S. PATENT DOCUMENTS

| | | | |
|---|---|---|---|
| 4,273,463 A | | 6/1981 | Dobersch |
| 4,522,527 A | * | 6/1985 | Grandpierre ......... 182/178.1 X |
| 4,595,077 A | * | 6/1986 | Buttgereit ............... 182/179.1 |
| 4,815,249 A | * | 3/1989 | Szucs ....................... 403/49 X |
| 5,560,730 A | * | 10/1996 | Gillard et al. ............ 403/49 X |
| 5,605,204 A | * | 2/1997 | Ausejo ..................... 403/49 X |
| 5,615,966 A | * | 4/1997 | Jarvis et al. .................. 403/49 |
| 5,988,318 A | * | 11/1999 | Krause ....................... 182/222 |
| 6,027,276 A | * | 2/2000 | Schworer .................... 403/49 |
| 6,406,211 B1 | * | 6/2002 | Hengstenberg et al. ....... 403/49 |

FOREIGN PATENT DOCUMENTS

| | | |
|---|---|---|
| EP | 0 486 381 A1 | 5/1992 |
| GB | 1163532 A1 | 9/1969 |
| SE | 423 735 B1 | 5/1982 |

* cited by examiner

Primary Examiner—Hugh B. Thompson
(74) Attorney, Agent, or Firm—Lerner, David, Littenberg, Krumholz & Mentlik, LLP

(57) ABSTRACT

A device for interconnecting scaffolding elements (4) and standards (3) of a scaffolding (1) or similar. An engagement member (2), open at the top in the operating mode and connected to the standard, has a first engagement surface (11) facing the standard but extending spaced therefrom, and a first bearing surface (33), in the operating position facing upwards. A hook-shaped member (7) attached to the scaffolding element (4) exhibits a second engagement surface (29) facing away from the standard and a second bearing surface, in the operating position facing downwards. The hook-shaped member is hooked into the engagement member and is supported thereby through co-operation between the first and the second engagement surfaces as well as the first and second bearing surfaces. The hook-shaped member (7) exhibits two side cheeks (13, 14) arranged in spaced (16) relationship with each other and fixedly attached to the scaffolding element (4). In the interconnected mode of the coupling device, each cheek extends with an end portion (17, 18) towards the standard (3). A distance piece (26) is located between the end portions of the side cheeks, is fixedly attached to the end portions of both side cheeks and exhibits the major portion of the second engagement surface (31).

5 Claims, 12 Drawing Sheets

# DEVICE FOR COUPLING SCAFFOLDING ELEMENTS

TECHNICAL FIELD

The present invention relates to a device for interconnecting scaffolding elements and standards of a scaffolding or similar, comprising on the one hand an engagement member, open at the top at least in the operating mode and connected to the standard, said member exhibiting a first engagement surface facing the standard but extending spaced therefrom, and a first bearing surface, in the operating position facing upwards, and on the other hand a hook-shaped member attached to the scaffolding element, exhibiting at least one second engagement surface facing away from the standard and a second bearing surface, in the operating position facing downwards and functioning to be hooked into said engagement member and to be supported thereby through co-operation between the first and the second engagement surfaces as well as the first and second bearing surfaces.

STATE OF THE ART

In order to obtain reasonably limited surface pressure at the engagement surfaces between the hook-shaped member and the engagement member of a coupling device, it is previously known to design the hook-shaped member like a three-dimensional body, see for example SE-B-7908679-9. In order to obtain the required shape of the three-dimensional body, the hook-shaped member was previously manufactured through casting or forging. The drawback of a casting is the limited tensile strength, whereas forging is relatively expensive and not suitable for series production in larger numbers.

DISCLOSURE OF INVENTION

The object of the present invention is to provide a coupling device that fulfils stringent demands on strength and rational, cost effective production.

Said object is achieved by means of a device according to the present invention, characterised by the hook-shaped member exhibiting on the one hand two side cheeks arranged in spaced relationship to each other and being fixedly attached to the scaffolding element, each cheek being arranged, in the interconnected mode of the coupling device, to extend with an end portion towards the standard, and on the other a distance piece located between the end portions of the side cheeks and exhibiting at least the major portion of said second engagement surface.

DESCRIPTION OF DRAWINGS

The invention will be described below with the aid of some embodiment examples, with reference to the enclosed drawings.

FIG. 3 shows a top view of the device according to FIG. 2, whereas

FIG. 10 shows a side view of the coupling device according to the invention in a fourth embodiment, comprising a locking device shown in the released position, whereas

PREFERRED EMBODIMENTS

Figure 1:
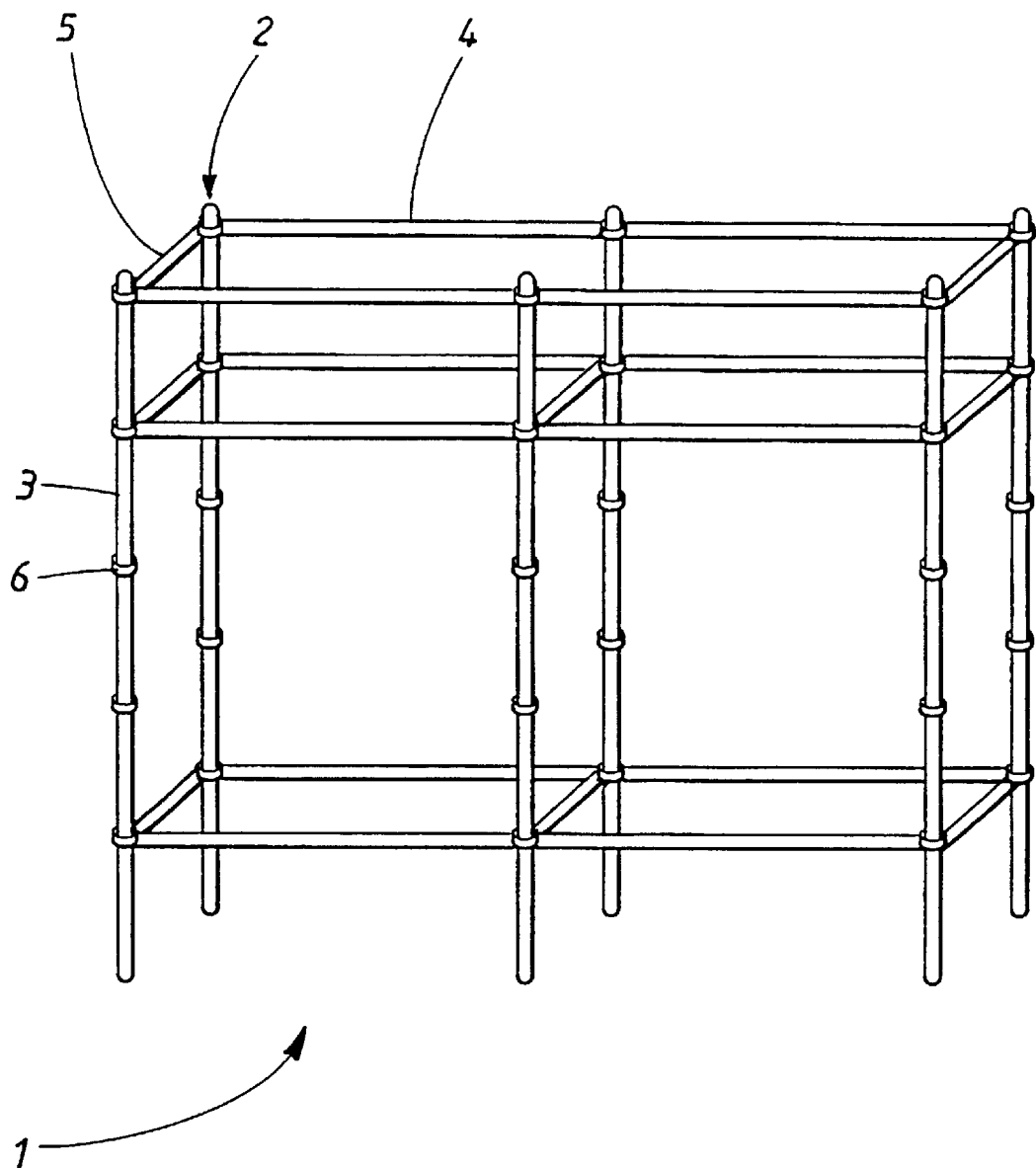
FIG. 1 shows an example of a simple scaffolding, to which the present invention can be applied.
Figure 2:
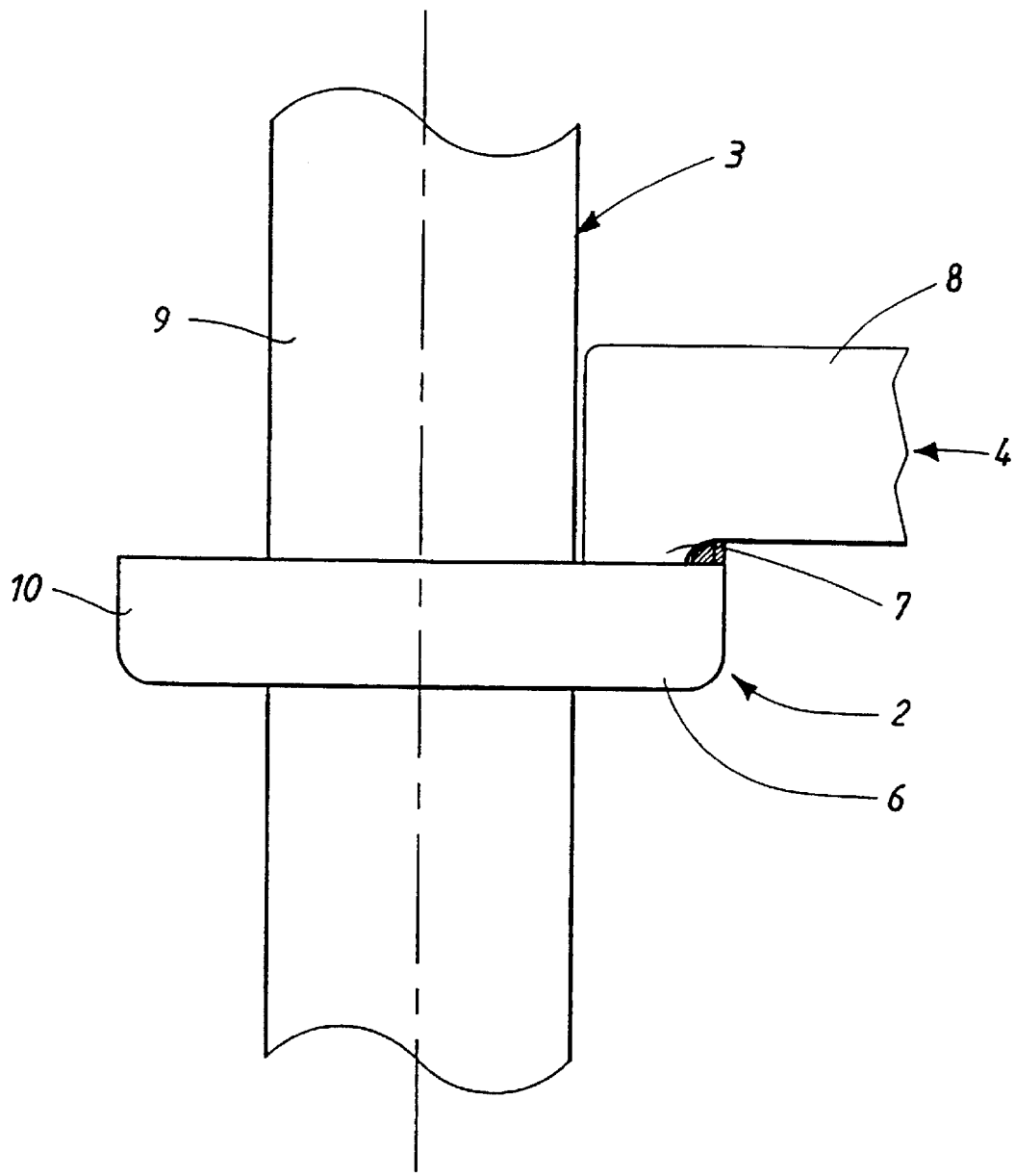
FIG. 2 shows a side view of a coupling device according to the invention in a first embodiment.

FIG. 1 shows an example of scaffolding 1, equipped with coupling devices 2 that may be of the type contemplated by the invention. The scaffolding consists of a number of standards 3 resting with their bottom ends on a base that may be the ground, a pavement, a floor or similar. The scaffolding also comprises, beside the standards, a further type of scaffolding elements, that is a number of lateral scaffolding elements 4, 5, interconnected with the standards for example by means of the coupling devices 2 according to the invention. By being connected to the standards at both their ends, the transversal scaffolding elements are supported through the interconnection. The coupling device may be a coupling of limited rigidity or of complete rigidity. In the latter case, the scaffolding could be completely freestanding, but in the traditional application placed alongside a building it is generally anchored thereto for reasons of security. The object of a traditional scaffolding is to support not illustrated building platforms, usually resting between lateral scaffolding elements 5, but the scaffolding may have a multitude of different applications and functions, such as forming a stage scaffolding during performances, carrying weather protection for people, vehicles or boats, or forming so-called braces for supporting concrete castings during construction. As can be seen from FIG. 1, the standards 3 exhibit a number of engagement members 6, comprised in the coupling devices 2, spaced along the lengths of the standards in order to allow connection of scaffolding elements 4, 5 at various levels. Besides lateral, elongated scaffolding elements 4, 5 constituting supporting parts of the scaffolding as a whole, it is conceivable for the coupling device 2 according to the invention to be used for the suspension of special scaffolding elements for special purposes, for example for anchoring lifting devices or other accessories for performing a specific task. In such a case the scaffolding elements do not have to be elongated or lateral and may in some cases be attached to only one standard and be connected to one or more engagement members.

With reference initially to FIGS. 2–7, the coupling device 2 according to the invention comprises, besides a first coupling member consisting of the engagement member 6, a second coupling member consisting of a hook-shaped member 7, which is fixedly attached to each end 8, or for special applications one end, of the lateral scaffolding elements 4. The engagement member 6 consists, in the first embodiment, of a bowl-shaped unit, fixedly attached for example by means of a welded joint to the standard 3, and more precisely to its envelope surface 9, which is cylindrical in the illustrated example, but might in principle be of angular shape, for example of the square pipe type or, in principle, a massive rod. In the illustrated example, the engagement member 6 exhibits an annular wall 10, extending around the envelope surface of the standard 3, with a first engagement surface 11 facing inwards, running parallel to or concentrically with the standard, i.e. at a constant distance from the envelope surface 9 of the standard. The engagement member 6 exhibits a bottom 12, preferably exhibiting not shown draining holes for water, particles etc. In principle, the bowl shape might be replaced with the cylindrical wall 10 only, being connected with the envelope surface 9 of the standard through load-carrying distance elements. The engagement member 6 thus defines a space 35, located between the engagement surface 11 and the envelope surface 9 of the standard.

The hook-shaped member 7 is functioning, in the connected mode of the coupling device, to extend down into the space 35 of the engagement member 6, in order to engage with, and be supported thereby. To this end the hook-shaped member 7 is constructed with two side cheeks 13, 14, extending on each side of an end portion 15 of the lateral scaffolding element 4 and being fixedly connected thereto by means of e.g. a welded or riveted joint or similar. The two side cheeks 13, 14 protrude with internal spacing between each other, i.e. with a distance 16 between them, and each exhibit an end portion 17, 18, intended to extend over and into the engagement member 6. The side cheeks 13, 14 have the shape of plates or sheet-like pieces, each with a fastening portion 19, 20 extending at a constant spacing, for example in parallel with each other, and having connection surfaces 21, 22 facing each other for connection with the end portion 15 of the scaffolding element. Said element in turn exhibits two parallel, preferably flat connection surfaces 23, 24, extending in the longitudinal direction of the side cheeks 13, 14, against which the connection surfaces 21, 22 of the fastening portions 19, 20 are intended to fit. Alternatively, the two side cheeks 13, 14 might extend with their portions 19, 20 into cavities of the scaffolding element 4 that, for reasons of weight and cost, will preferably be tubular.

Figure 3:
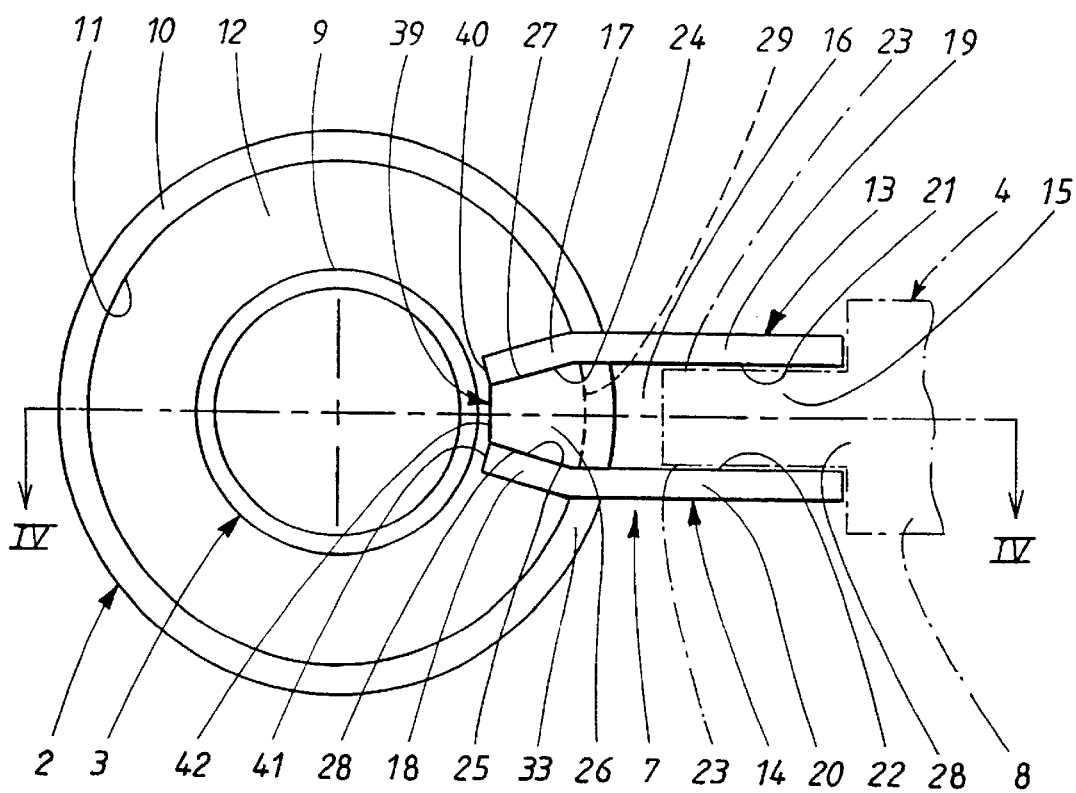

As is best seen in FIG. 3, the two side cheeks 13, 14 are, at their end portions 17, 18 turned towards the standard 3, angled towards each other, i.e. are provided with surfaces converging on and facing one another, defining connection surfaces 24, 25 for connection with a distance piece 26 comprised in the hook-shaped member 7, filling out the space between the two side cheeks at their end portions 17, 18. Preferably, the distance piece is also designed with connection surfaces 27, 28 converging towards each other at the same angle as the side cheek connection surfaces, whereby a surface contact with a wedge effect is obtained, which is effective in absorbing the forces that the coupling device is subjected to. The distance piece 26 is preferably connected with the side cheeks by means of welding joints at the connection surfaces.

Through the construction described above, the side cheeks 13, 14 can be made from thick sheet steel that is given a shape well suited to the function.

Figure 4:
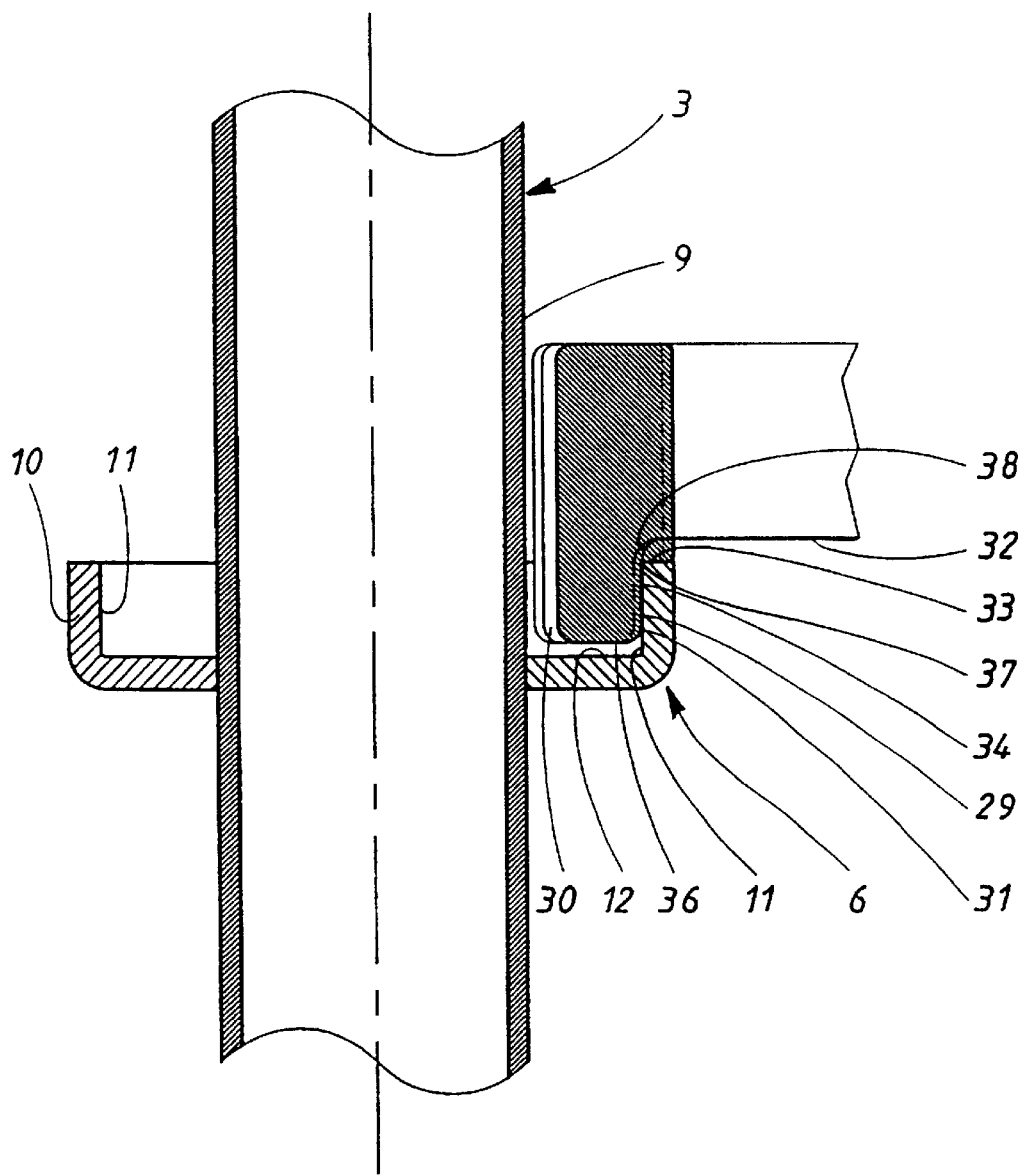
FIG. 4 is a cross-section through the coupling device along the line IV—IV in FIG. 3.
Figure 5:
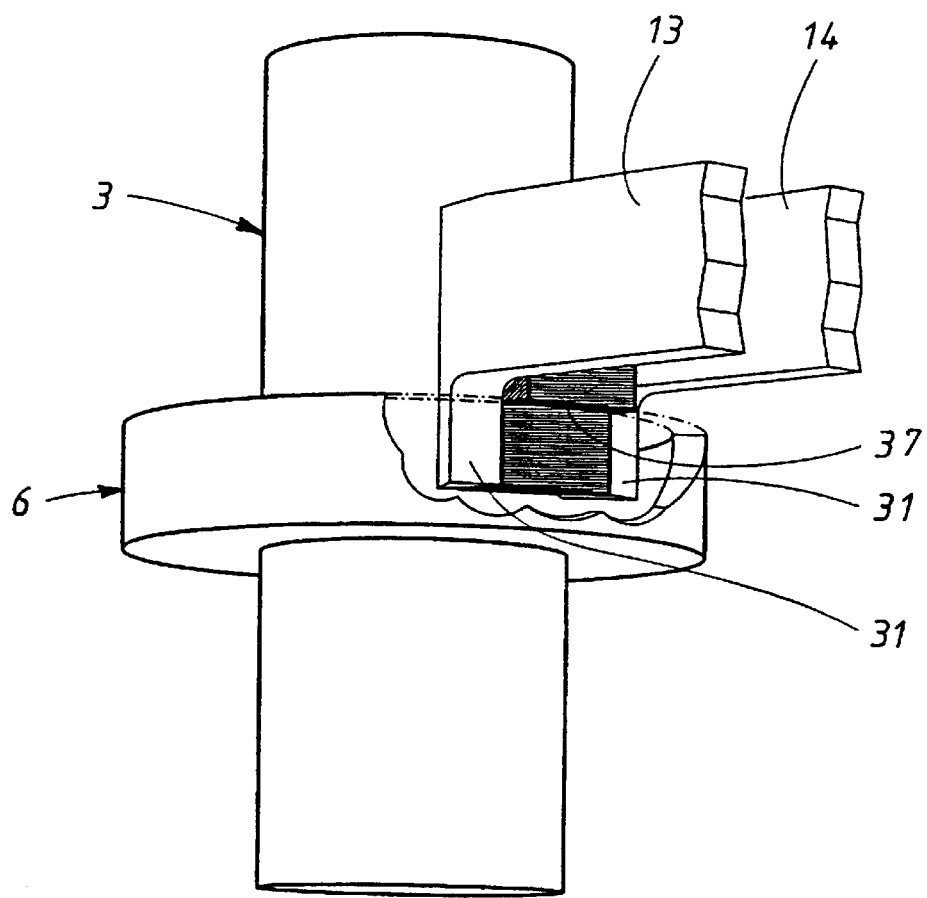
FIGS. 5, 6 and 7 illustrate perspective views, partially broken, of the coupling device in a first embodiment.
Figure 6:
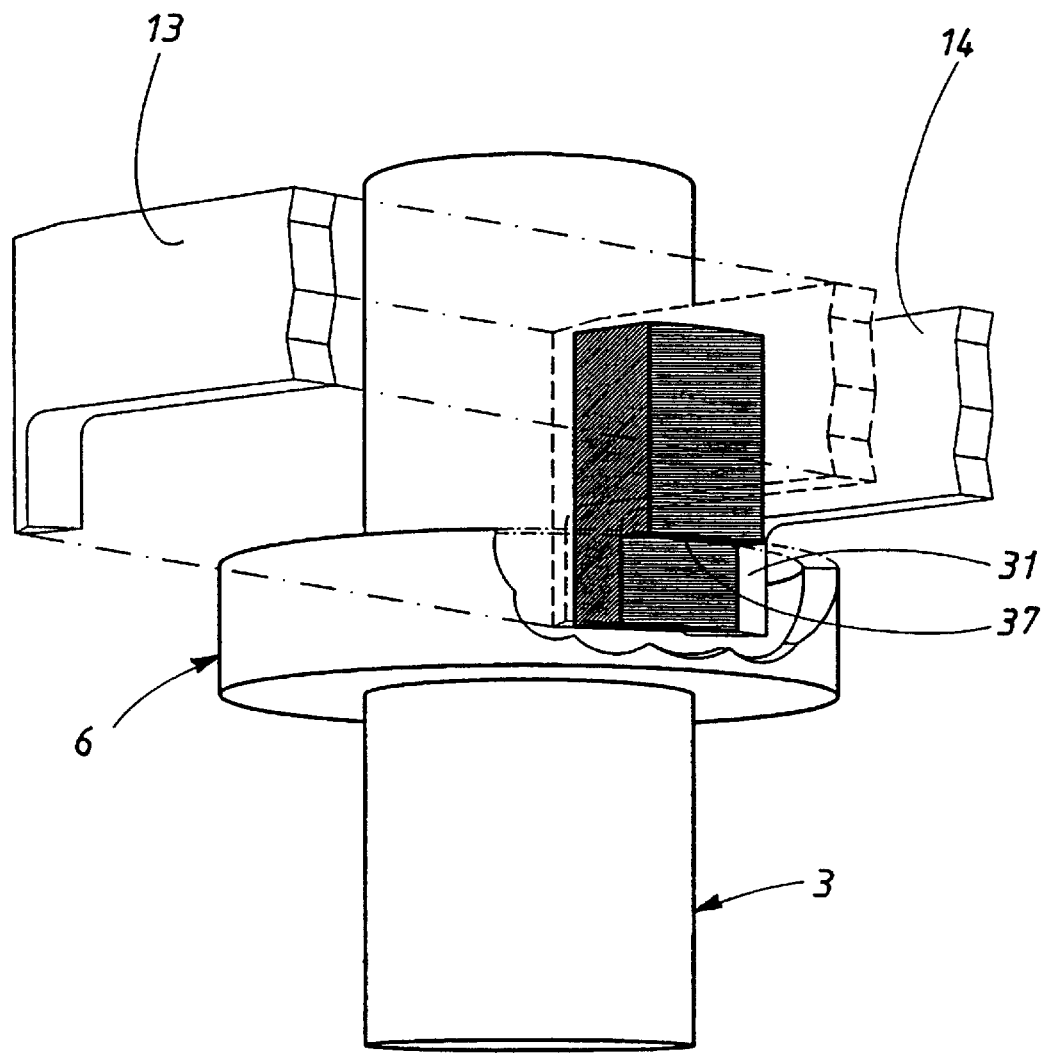
Figure 7:
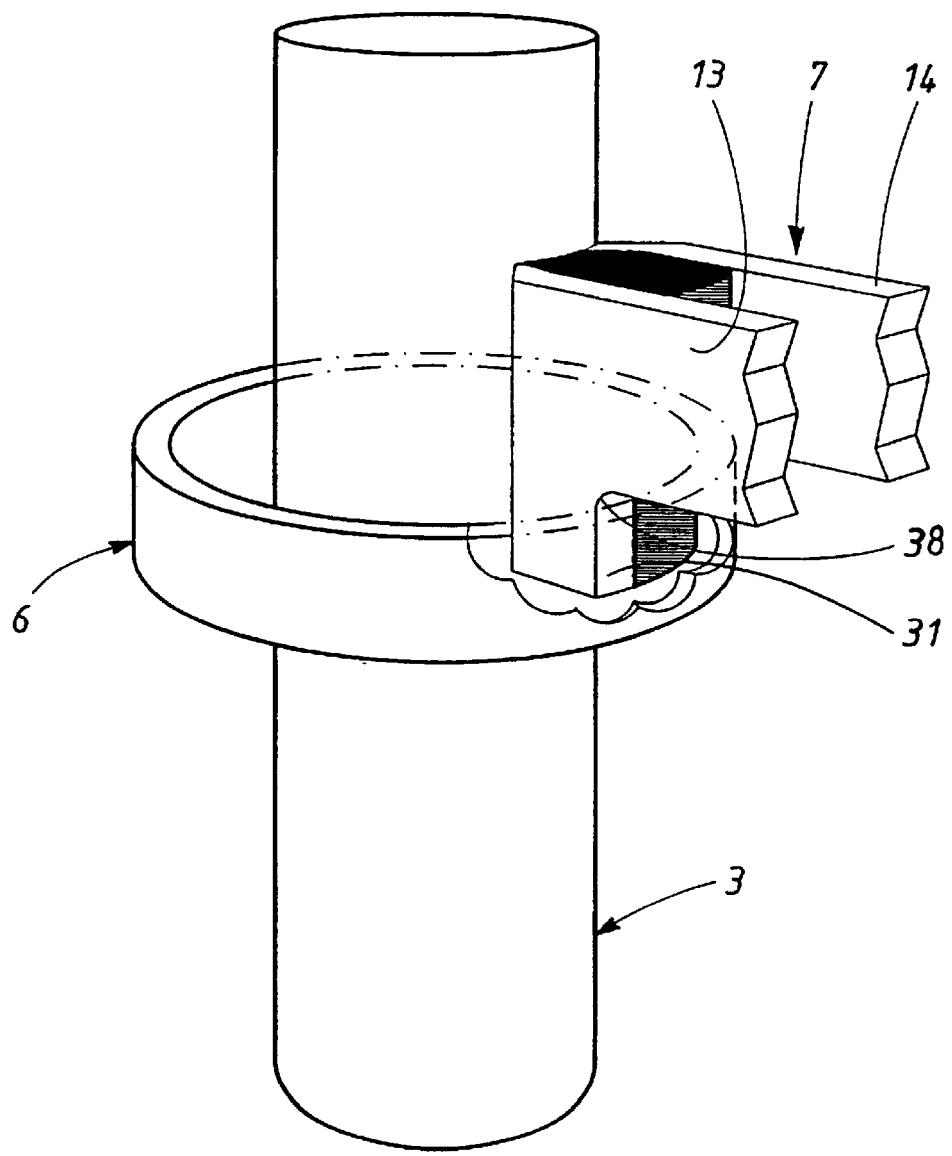

As can best be seen from the cross-sectional view of FIG. 4, the engagement surface 11 consists of a first engagement surface intended to co-operate with a second engagement surface 29, provided on the hook-shaped member 7, which is facing away from the standard 3 but facing towards the engagement surface 11 of the engagement member 6, i.e. the first engagement surface. Even if it is not clearly shown, the second engagement surface 29 is also curved, more specifically convexely curved with the same shape as the engagement surface 11 of the engagement member, securing a surface contact. Thus, the engagement surface 29 is preferably shaped like a cylinder envelope. The two side cheeks 13, 14 each extend downward at their end portions 17, 18, with a hook-shaped portion 30, as can be gathered from FIGS. 4–7, on both sides of the distance piece 26, and each of them defines, by means of its radially away from the standard 3 facing edge surface 31 that is facing the engagement surface 11 of the engagement member, an engagement surface that complements the engagement surface of the distance piece 31.

The side cheeks 13, 14 as well as the distance piece 26 are so dimensioned that their downwards extending end surfaces are not carrying any load but exhibit a distance to the upward-facing bottom surface 12 of the engagement member 6. Nor do the downward-facing edge portions 32 of the side cheeks 13, 14 have to form load-carrying bearing surfaces against the engagement member 6, but they are preferably dimensioned so as to create a distance to the upward-facing bearing surface 33 of the engagement member defined by the annular, in the illustrated example circular, edge of the wall 10. Said edge defines a first bearing surface of the coupling device, said surface functioning to co-operate with a downward-facing, correspondingly shaped bearing surface 34 on the distance piece. This bearing surface thus extends downwards a distance below the downward-facing edge portions 32 of the side cheeks 13, 14, and will consequently be carrying the load, mainly regarding vertical loads.

Between the convex engagement surface 29 of the distance piece 26 and its downward-facing bearing surface 34 an inner corner 37 is formed, preferably having the same shape as the corresponding corner 38 between the engagement surface 11 and the bearing surface 33 of the engagement member 6, in the illustrated example with a relatively small radius, as seen in the cross-section of FIG. 4. Through the downward-facing edge surfaces 32 of the side cheeks 13, 14 not having to serve as bearing surfaces against the bearing surface of the engagement member 6, i.e. the edge 33, the inner corners 38 of the side cheeks can be given a substantially larger radius of curvature than that of the corner 37, which reduces tensions created by bending stresses on the hook-shaped portions 30 of the side cheeks.

Figure 8:
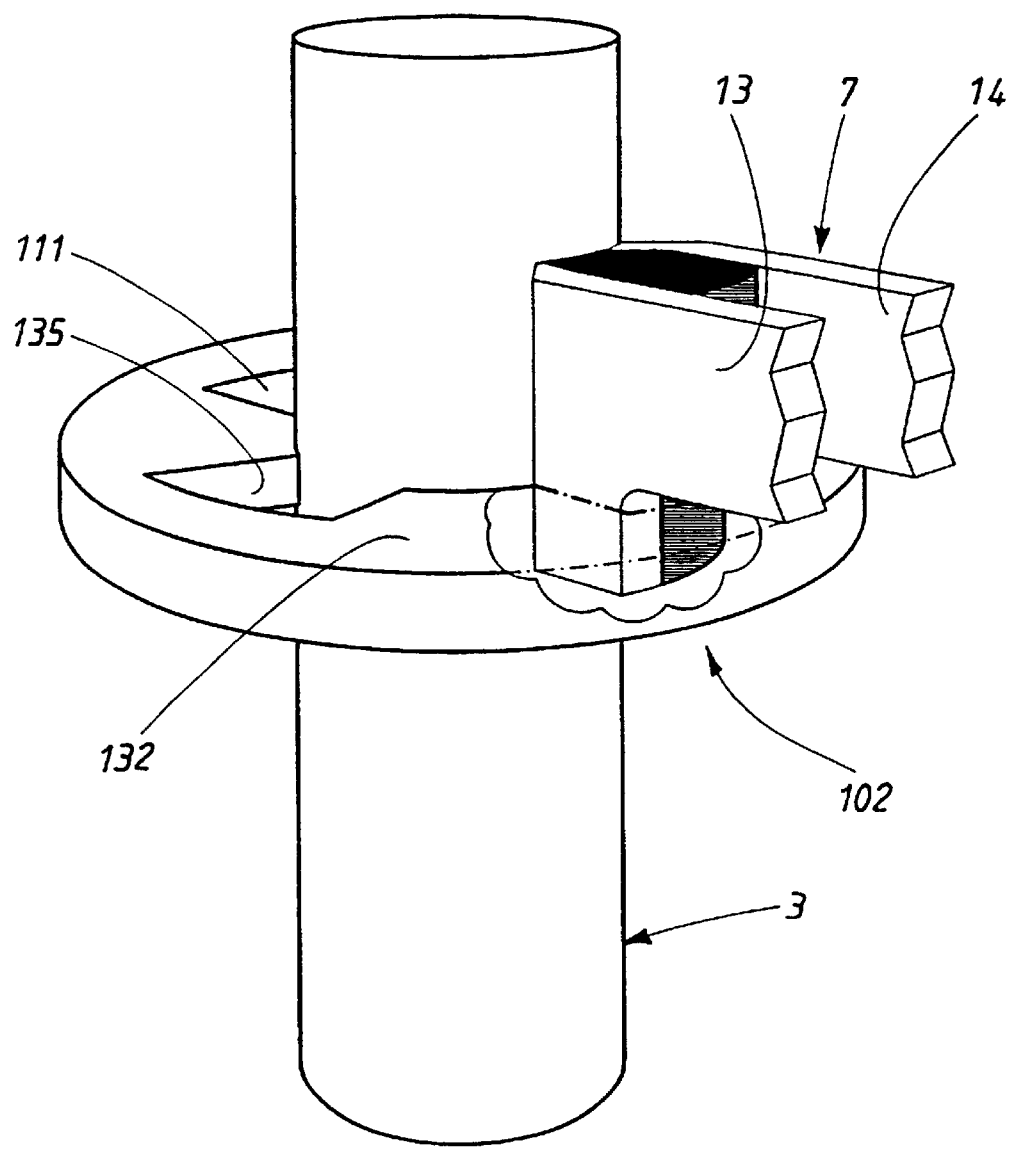
FIG. 8 shows the coupling device according to the invention in a partially broken perspective view, in a second embodiment, with the same design of the hook-shaped member as in the previous embodiment, but with a variation of the engagement member, whilst

FIG. 8 shows a second embodiment of the coupling device, here designated as 102. The hook-shaped member 7 in this example has the same design as in the previous example, whereas the engagement member, here designated by 106, instead of a bowl shape, consists of a disk wherein the hook-shaped member 7 extends downwards into a recess 135, exhibiting a wall facing the envelope surface of the standard defining the first engagement surface, i.e. the surface 11, which in the illustrated example is preferably curved. The upward-facing bearing surface 132 of the engagement member 106 is here defined by the topside of the disk-shaped element, against which the downward-facing bearing surface 34 of the hook-shaped member 7 is intended to rest.

Figure 9:
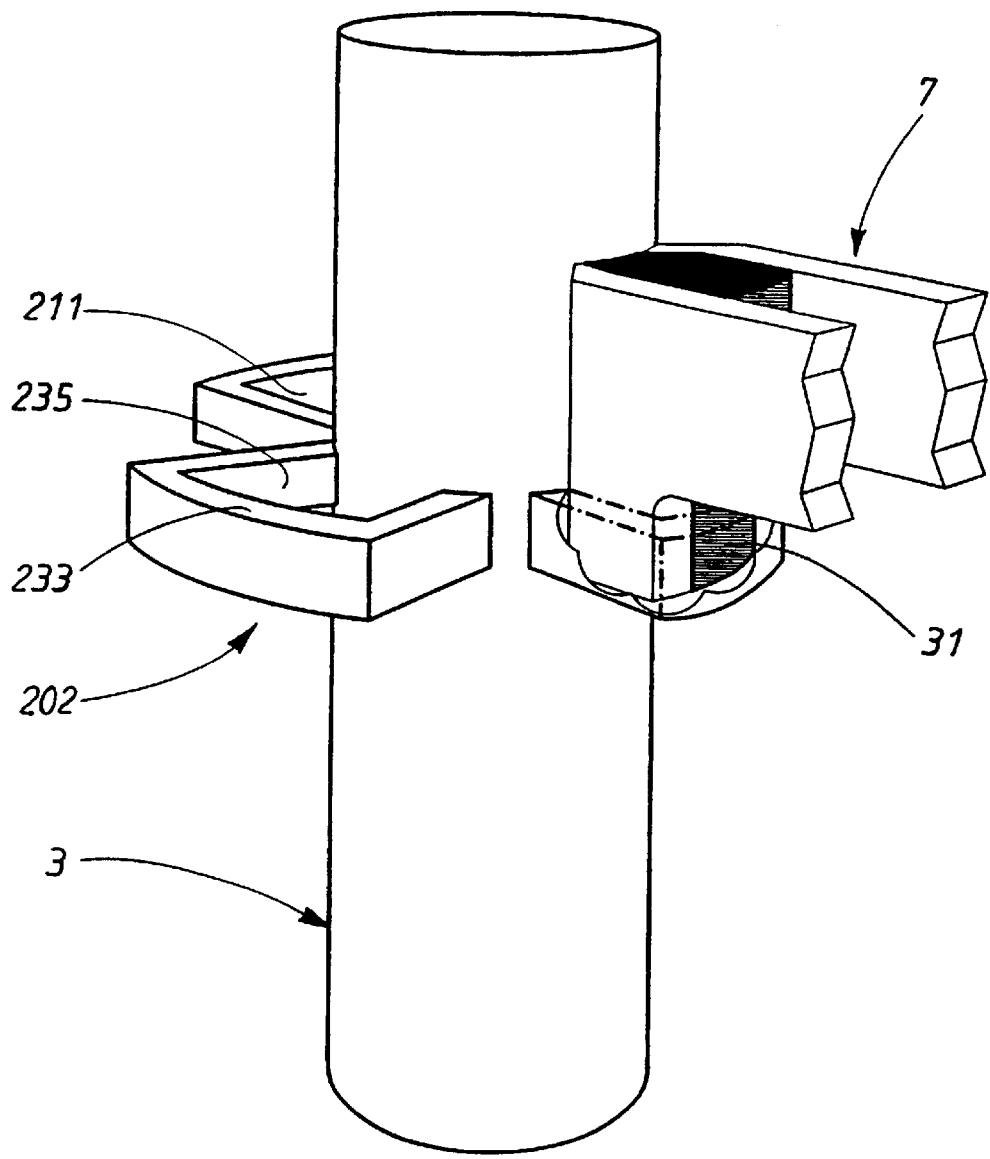
FIG. 9 shows the coupling device according to the invention in a partially broken perspective view, in a third embodiment with a further variation of the engagement member.

FIG. 9 shows a further variant of the engagement member, here designated as 202. Said member here consists of a number of, e.g. four, clamp elements in spaced arrangement around the standard 3, each one comprising a recess 235 into which the hook-shaped member 7 is intended to extend downwards. Also this variant exhibits a first engagement surface 211, facing the standard, which is preferably concavely curved and intended to co-operate with the engagement surface 31 of the hook-shaped element. The clamps exhibit a topside 233 defining the upward-facing bearing surface intended to co-operate with the downward-facing bearing surface of the hook-shaped member, i.e. of the distance piece.

In the embodiments described above the envelope surface 9 of the standard 3 defines a position limitation radially inwards for the hook-shaped member 7, in co-operation with the end surface 39 of the hook-shaped member radially facing the standard. Said end surface consists of the end surfaces 40, 41 of the side cheeks 13, 14 and/or the end surface 42 of the distance piece 26, depending on their relative positions. For tolerance reasons, however, the hook-shaped member is sized so that the radial dimensions of the portion thereof extending down into the engagement member 6 will always be smaller than the radial dimension of the recess 235.

In the embodiments described above, however, this radial difference must fall below the radial width of the downward-facing bearing surface 34 of the hook-shaped member 7, to prevent it from sliding inside of the upward-facing bearing surface 33 of the engagement member 6. Through this, a coupling device with limited rigidity is achieved, that can still take up large vertical, downward forces on the lateral scaffolding elements, lateral forces acting upon the standards and deflection forces striving to tilt standards and lateral elements in relation to each other.

A completely rigid coupling between standard 3 and lateral scaffolding elements 304 is obtained by means of a coupling device to be described with reference to FIGS. 10–13. The hook-shaped member 307 has the same construction with sheet-like side cheeks 314 and a distance piece as in the previous embodiments, but the side cheeks may, as shown, have another contour shape, e.g. because the lateral scaffolding element 304 may be of the grid type, i.e. with two horizontal elements exhibiting a number of bars between them. This type of element could advantageously be used as protective railing in a scaffolding construction. The lower element may hereby be coupled directly to the standard 3 at a lower located engagement member (not shown) by means of a second coupling device, for example of the initially described type without a locking device. Between the two coupling devices a vertical scaffolding element 343 may extend. The engagement members 6 may have the same design as described above, i.e. with an engagement surface 11 and a bearing surface 33.

Figure 10:
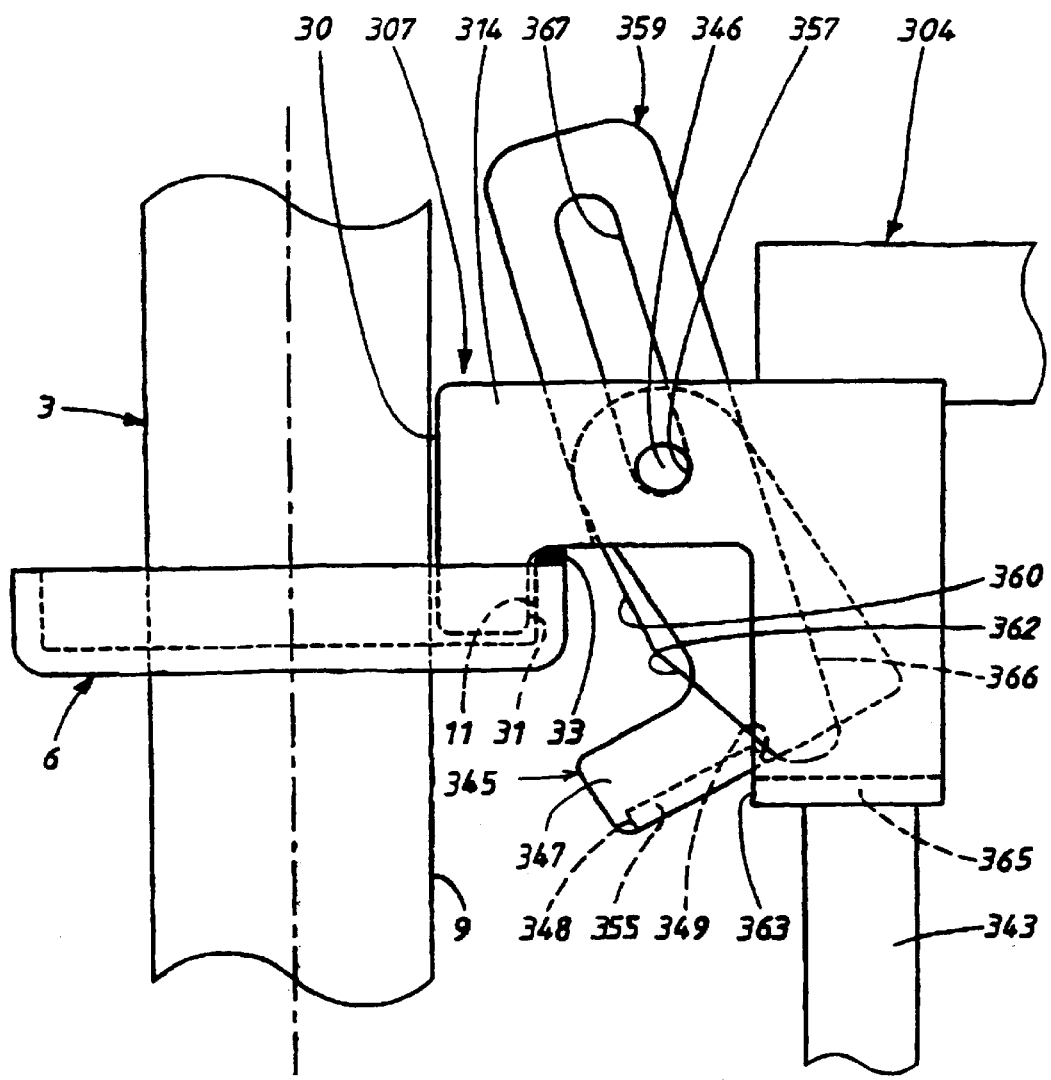
Figure 11:
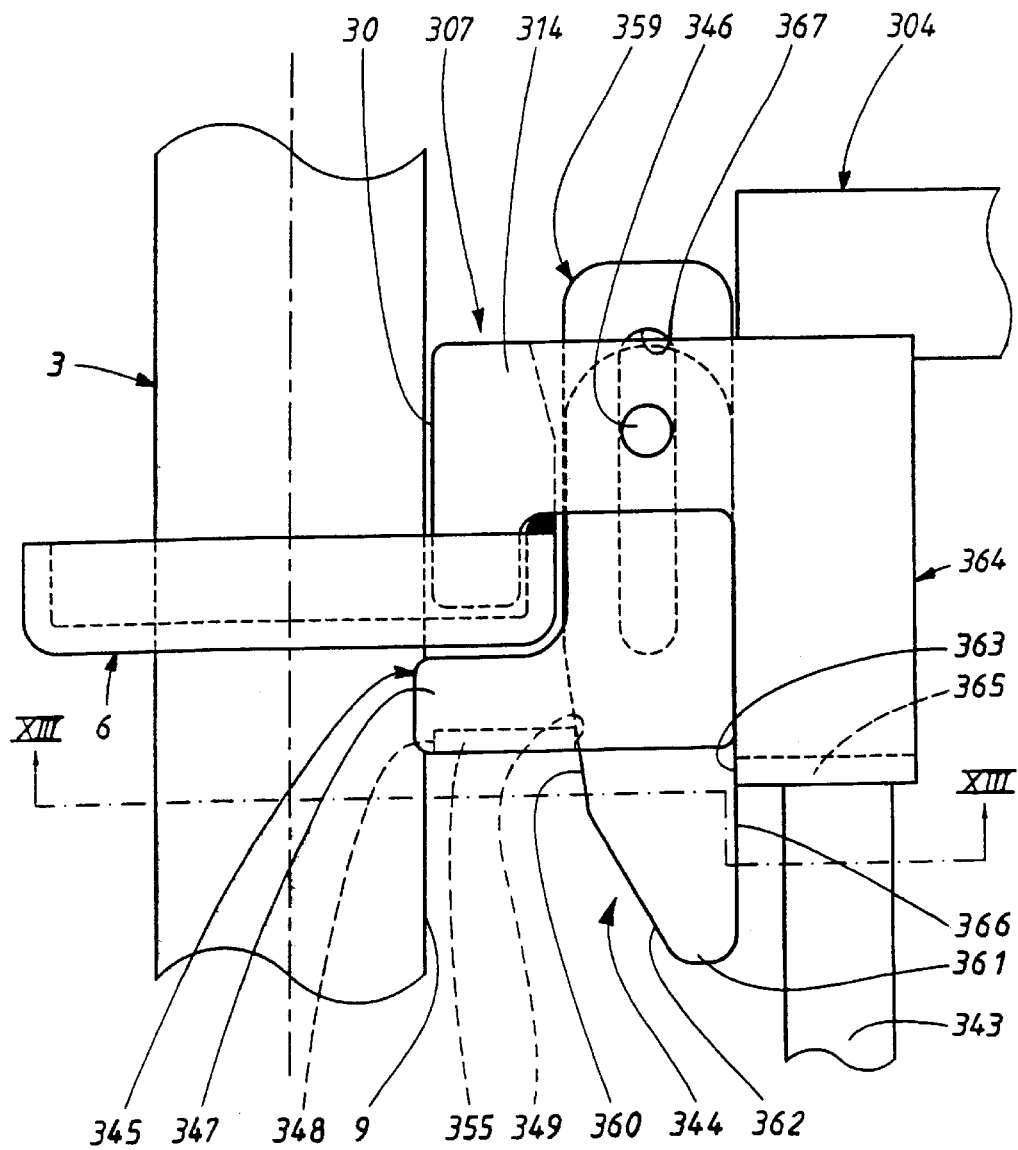
FIG. 11 shows the fourth embodiment with the locking device in the locked position.
Figure 12:
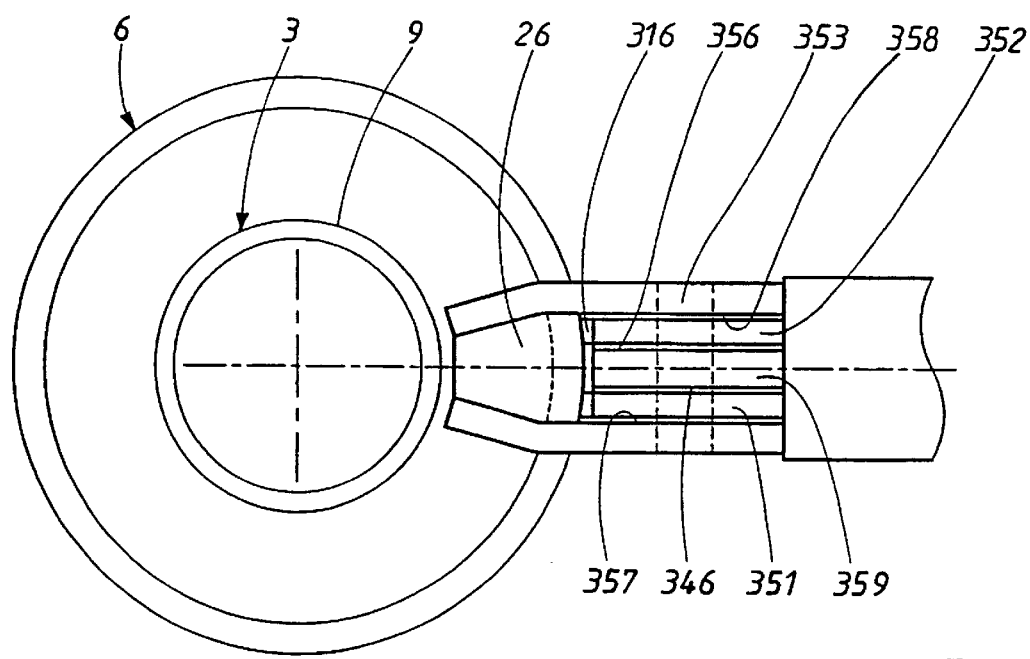
FIG. 12 is a top view of the device according to FIG. 11, whilst
Figure 13:
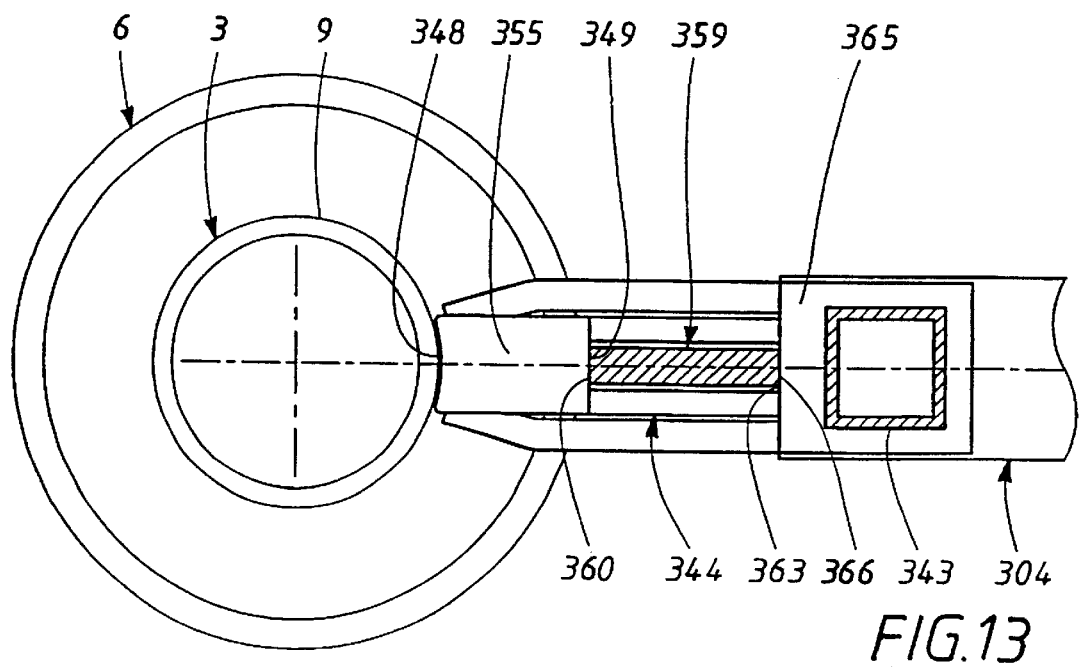
FIG. 13 is a partially broken cross-section through the device along the line XIII—XIII in FIG. 11.

In the third embodiment of the coupling device shown in FIGS. 10–13, a locking device 344 is included, in FIG. 10 shown in an unlocked position and in FIGS. 11–13 in a locked position. The locking device exhibits a first bracing member 345, in the illustrated example inserted between the two side cheeks 314 and pivotally connected thereto by means of an axle 346. This bracing member 345 is in this example generally L-shaped in a side view and exhibits, in a lower, protruding portion 347 a bracing surface 348 facing forward. The forward direction in this case signifies towards the standard, whereas rearward signifies the opposite direction.

The bracing member 345 further exhibits a rearward-facing bracing surface 349, facing in a direction away from the forward-facing bracing surface and also being arranged at the lower portion 347, at a distance from the pivot point of the bracing member, i.e. its axle 346, which extends between the two side cheeks 314 and, in the illustrated example, also through them via a bore 350, see the top view in FIG. 12. Here it may also be gathered that the bracing member 345 consists of two plate-shaped portions 351, 352, interconnected at the top end by means of the transversal axle 346 thrust through the bores 354 and at the bottom by means of an intermediate portion 355. Like the two side cheeks 314, 353 of the hook-shaped member, this bracing member is preferably made from heavy plate material of e.g. steel, and it can be made in one piece through bending into U-shape as seen in the direction of the forward-facing bracing surface 48 that in the illustrated example is U-shaped. As may further be gathered from FIG. 12, the two plate-shaped portions 351 and 352 of the bracing member 345 are located with such a relative spacing that the bracing member width is somewhat less than the distance between the two side cheeks 314, 353. Further, the two portions 351, 352 of the bracing member 345 exhibits between them a space 356 delimited by the two oppositely facing interior surfaces 357, 358 of said bracing member.

In the space 356 between the two plate-shaped portions 351, 352 of the first bracing member 345, a second bracing member 359 is arranged, forming a locking wedge through exhibiting a wedge-shaped, reduced dimension in the downwards direction, as seen in the radial direction of the standard 3. The second bracing member 359 namely exhibits an angled, forward bracing surface 360 that, in the direction of the lower end 361 of the locking wedge continues into a further angled surface serving as a guide surface 362 for guiding the locking wedge into its locking position, as shown in FIGS. 11–13.

In order to achieve a locking action, the coupling device exhibits a bearing surface for the locking wedge 359, defined by a rear, forward-facing bracing surface 363 provided at a rear, downward-protruding portion 364 of the hook-shaped member 307 of the coupling device. The rear, downward-facing portion 364 preferably consists of an extension of the two side cheeks 314, 353 and likewise consists of two spaced, i.e. located with an intermediate space, plate-shaped portions, preferably made integrally with the side cheeks described above. Said space enables the accommodation of portions of the first bracing member 345 as well as the second bracing member 359 in the unlocked position, see FIG. 10. The bracing surface 363 for the locking wedge 359 in the illustrated example is defined by a member 365 extending between the two downward-protruding portions 364, defining a lower, transversal portion, in this example simultaneously defining the fastening portion for the vertical element 343 of the scaffolding element 304. Said vertical element is preferably welded to the fastening portion. The transversal portion 365 can be comprised of a welded crosspiece between the two parallel portions 364, or be created through U-bending of one single sheet blank into forming the two side cheeks 314, 353 as well as the transversal portion 365. In this manner, a forward-facing edge of the transversal portion is formed, said edge defining the forward-facing bracing surface 363 functioning to co-operate with a rearward-facing edge of the locking wedge, in this case of its intermediate portion 355, that defines the rearward-facing bracing surface 349.

With the locking device in the unlocked position, as shown in FIG. 10, the coupling device functions entirely according to the manner described above with reference to the embodiments of FIGS. 2–9. Through this, the coupling device can thus be interconnected by the hook-shaped member 307 being inserted into the engagement member 6 and resting therein, through co-operation between the engagement surface 31 and bearing surface 34 of the hook-shaped member 307 and the corresponding engagement surface 11 and bearing surface 33 of the engagement member and between the abutting surface of the hook-shaped member 30 against the envelope surface 9 of the standard. This position is secured by the gravity providing a continuous vertical force action striving to maintain the hook-shaped member in the engaged position. With the locking device in the unlocked position it is in a corresponding manner easy to separate the coupling members by lifting the lateral scaffolding element vertically and removing the hook-shaped member from the engagement member.

In the coupled position the locking device is activated by pivoting the first bracing member 345 into the position shown in FIG. 11, whereby the forward-facing bracing surface of the first bracing member will abut the envelope surface 9 of the standard. It may be gathered from FIG. 11 that the first bracing member is designed in such a manner, as seen in the vertical plane, as to extend about the engagement member without contact with it, such that only the intended bracing surface 348 will come into contact with the standard. Then the second bracing member 359 is brought into locking position. This is performed more or less through the weight of the wedge itself, when the first bracing member has been pulled away, the guide surface 362 hereby guiding the wedge so as to make the forward-facing bracing surface 360 of the wedge arrive into contact with the rearward-facing bracing surface 349 of the first bracing member, see FIGS. 11 and 13. There will thus be a wedge effect by the wedge getting a rear support with its rearward-facing bracing surface 366 in contact with the forward-facing bracing or bearing surface 363 of the hook-shaped member, in turn creating a bracing force between the forward-facing bracing surface 360 of the wedge and the rearward-facing bracing surface 349 of the first bracing member. This will in turn create a bracing or locking force between the forward-facing bracing surface 348 of the first bracing member and the envelope surface 9 of the standard. As the different bracing surfaces are not necessarily located in the same radial plane, any turning torque in the first bracing member as well as the second bracing member, i.e. the locking wedge, through co-operation between the axle 346 and the attachment of the first locking member therein and the elongated slot-shaped aperture 367 of the wedge, more precisely the edge surfaces thereof. The enclosed slot-shaped aperture further delimits the mobility of the wedge. For a secure wedge effect, it is necessary for the wedge angle, i.e. the inclination of the bracing surface 360, to cause only small upwards vertical forces, smaller than the friction forces in the bracing surfaces of the wedge.

The invention will not be limited to the embodiments described above and illustrated in the drawings, but may be varied within the scope of the appended claims. For example, also the coupling devices according to FIGS. 8 and 9 can be provided with the locking device according to FIGS. 10–13.

The locking device can be embodied in various ways. For example, the first bracing member can be designed with a portion located above the engagement member having an upper bracing surface arranged to be brought into contact with the standard in the locked position. No axle is necessary between the first bracing member and the hook-shaped member. The design of the first bracing member is hereby of in principle the same type shown in SE-B-798067-99. Unlike the known embodiment, the first bracing member however extends inside the side cheeks of the hook-shaped member, like the embodiment of FIGS. 10–13. It should further be pointed out that in FIGS. 10–11, the two engagement surfaces are shown, for the sake of clarity, with a relative clearance. Especially in the locked position there will be no clearance, as the locking device will press the engagement surfaces against each other.

What is claimed is:

1. A device for interconnecting a scaffolding element and a standard, said device comprising:

an engagement member having an open top adapted for connection to the standard, said engagement member comprising a first engagement surface spaced from the standard and adapted to face the standard and a first bearing surface facing upward at a perimeter of said engagement member;

a hooked-shaped member adapted to attach to said engagement member, said hook-shaped member having at least one second engagement surface facing away from the standard and a second bearing surface facing downward while said hooked shaped member is in an operating position, said hook-shaped member adapted to be hooked into said engagement member and to be supported thereby through cooperation between said first and second engagement surfaces and said first and second bearing surfaces;

said hooked shaped member comprising two side cheeks arranged in spaced relationship to each other with a distance piece therebetween, said side cheeks adapted to be fixedly attached to the scaffolding element, each of said side cheeks extending at a first end portion toward the standard and at a second end portion away from the standard, said distance piece comprising at least the major portion of said second engagement surface, at least the end portions of said side cheeks being provided with inward-facing connection surfaces converging toward the standard and each other for connection with said distance piece, and wherein the distance piece includes two connection surfaces converging toward the standard and facing the connection surfaces of the side cheeks.

2. The device of claim 1, wherein the connections between said side checks and said distance piece are welded joints.

3. The device of claim 2, wherein the side cheeks comprise pieces of plate, said plate bent so as to define converging connection surfaces.

4. A device for interconnecting a scaffolding element and a standard, said device comprising:

an engagement member having an open top adapted for connection to the standard, said engagement member comprising a first engagement surface spaced from the standard and adapted to face the standard and a first bearing surface facing upward at a perimeter of said engagement member;

a hooked-shaped member adapted to attach to said engagement member, said hook-shaped member having at least one second engagement surface facing away from the standard and a second bearing surface facing downward while said hooked-shaped member is in an operating position, said hook-shaped member adapted to be hooked into said engagement member and to be supported thereby through cooperation between said first and second engagement surfaces and said first and second bearing surfaces;

said hooked shaped member comprising two side cheeks arranged in spaced relationship to each other with a distance piece therebetween, said side cheeks adapted to be fixedly attached to the scaffolding element, each of said side cheeks extending at a first end portion toward the standard and at a second end portion away from the standard, said distance piece comprising at least the major portion of said second engagement surface;

said device further comprising a locking device comprising a first bracing member having a forward bracing surface adapted to be pressed against the standard and a second bracing member having a wedge shape, and, in a locked position, functions to receive support from a bracing surface of the hooked-shaped member and to press, with wedge effect, by said bracing surface of said second bracing member, facing forward, toward the standard, against said bracing surface on said first bracing member, facing away from the standard, whereby said engagement surface of said hook-shaped member is pressed against said engagement surface of said engagement member.

5. The device of claim 4, wherein the first bracing member consists of two plate-shaped portions extending at their top ends into a space between the side cheeks of the hook-shaped member and exhibiting a second space between them that is bridged at the bottom end by an intermediate portion interconnecting the plate-shaped portions of the first bracing member; wherein the forward bracing surface is adapted to be pressed against the standard and the bracing faces away from the standard and said wedge-shaped bracing member is adapted to be received in the space between the plate-shaped portions of the first bracing member.

* * * * *

UNITED STATES PATENT AND TRADEMARK OFFICE
CERTIFICATE OF CORRECTION

PATENT NO. : 6,688,430 B1
DATED : February 10, 2004
INVENTOR(S) : Harry Wallther It is certified that error appears in the above-identified patent and that said Letters Patent is hereby corrected as shown below:

Column 4,
Lines 30, 31 and 39, "comer" should read -- corner --.
Line 38, "comers" should read -- corner --.

Signed and Sealed this

Eleventh Day of May, 2004

JON W. DUDAS
*Acting Director of the United States Patent and Trademark Office*